United States Patent [19]

Volkhin et al.

[11] Patent Number: 4,700,468
[45] Date of Patent: Oct. 20, 1987

[54] METHOD OF ASSEMBLING A CYLINDRICAL STORAGE BATTERY

[75] Inventors: Nikolai N. Volkhin; Vladimir P. Ardabatsky; Valery V. Luzin, all of Leningrad, U.S.S.R.

[73] Assignee: Vsesojuzny Nauchnoissledovatelsky Proektno-Konstruktorsky I Tekhnologichesky Akkumulyatorny Institut, Leningrad, U.S.S.R.

[21] Appl. No.: 879,023

[22] Filed: Jun. 26, 1986

[51] Int. Cl.⁴ .......................................... H01M 10/04
[52] U.S. Cl. .................................................. 29/623.2
[58] Field of Search ............... 429/172, 171, 163, 164, 429/94, 175, 118, 72; 29/623.1, 623.2; 204/2.1

[56] References Cited

U.S. PATENT DOCUMENTS

| | | | |
|---|---|---|---|
| 1,367,594 | 2/1921 | Ford | 429/175 |
| 3,489,609 | 1/1970 | Popat et al. | 429/166 |
| 3,823,040 | 7/1974 | Jagid | 429/118 |
| 3,867,201 | 2/1975 | Holmes | 429/118 |
| 4,454,208 | 6/1984 | Osmialowski | 429/163 |
| 4,476,202 | 10/1984 | Wesner | 429/94 |

FOREIGN PATENT DOCUMENTS 2293803  7/1976  France .

Primary Examiner—Anthony Skapars
Attorney, Agent, or Firm—Lilling & Greenspan

[57] ABSTRACT

A method of assembling a cylindrical storage battery includes the step of mounting a block of electrodes in the body of the cylindrical storage battery, and the lid thereof with a gasket is installed on the body of the cylindrical storage battery. Thereupon, the edge of the body of the cylindrical storage battery is rolled-in through the gasket to the storage battery lid, the cylindrical storage battery is filled with a measured quantity of electrolyte, the cylindrical storage battery is electrically charged and discharged and a valve is installed in the lid of the cylindrical storage battery.

1 Claim, 1 Drawing Figure

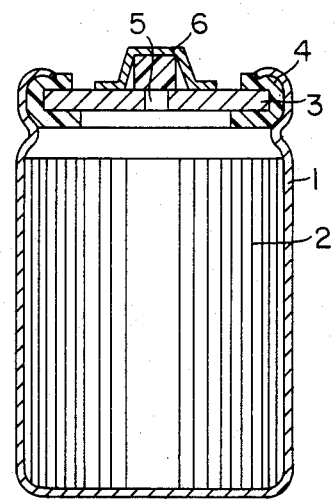

METHOD OF ASSEMBLING A CYLINDRICAL STORAGE BATTERY

BACKGROUND OF THE INVENTION

1. Field of the Invention

The present invention relates to the electric-power industry and, more particularly, to methods of assembling cylindrical storage batteries.

The invention may be used in producing chemical sources of electric energy, mostly cylindrical storage batteries.

2. Description of the Prior Art

Present-day developments of small-sized portable radio-electronic equipment and electrotechnical devices of various designations places more stringent demands upon the reliability and useful life of electric energy sources which power them, in particular, upon the dependable sealing of cylindrical storage batteries.

Known in the art is a method of assembling cylindrical storage batteries (cf. French Pat. No. 7440050, class HOIM 4/76, 1976), which comprises the operations of arranging a block of electrodes in the body of the cylindrical storage battery, filling the latter with a measured quantity of electrolyte, mounting a valve on the lid of the storage battery, installing the battery's lid with a gasket in the cylindrical storage battery body, rolling-in the edge of the storage battery via the gasket to its lid, and electrically charging and discharging of the cylindrical storage battery.

However, the disclosed method of assembling the cylindrical storage battery involves the ingress of electrolyte to the surface of the gasket which leads to the moistening of the contacting surfaces and, consequently, makes the battery sealing less reliable.

SUMMARY OF THE INVENTION

It is an object of the present invention to enhance the reliability of sealing of cylindrical storage batteries.

Said object is accomplished by the method of assembling the cylindrical storage battery which comprises the operations of mounting a block of cylinders in the storage battery body, filling the cylindrical storage battery with a measured quantity of electrolyte, installing a.valve above the opening in the lid of the cylindrical storage battery, mounting the lid with a gasket in the cylindrical storage battery body, rolling-in the edge of the cylindrical storage battery body through the gasket to its lid and electrically charging and discharging of the cylindrical storage battery. According to the invention, subsequent to the installation of the block of electrodes in the body of the cylindrical storage battery, first the lid of the storage battery is mounted together with the gasket on the body of the storage battery, then the edge of the cylindrical storage battery body is rolled-in via the gasket to its lid, the cylindrical storage battery is filled with a measured quantity of electrolyte, and the cylindrical storage battery is electrically charged and discharged, and the valve is mounted above the opening in the lid of the cylindrical storage battery.

BRIEF DESCRIPTION OF THE DRAWING

A better understanding of the claimed invention and the advantages and objects thereof will be will be had by reference to a specific embodiments of the invention taken in conjunction with the accompanying drawing the sole FIGURE of which represents a longitudinal sectional view of a known cylindrical storage battery and given method for assembling a cylindrical storage battery.

DESCRIPTION OF THE PREFERRED EMBODIMENT

A storage battery comprising a roll block 2 of electrodes accommodated in a body 1. Mounted on the body 1 is a lid 3 which is embraced around the periphery by a ring-shaped gasket 4. A valve 6 is arranged on the lid 3 above and opening 5.

The method of assembling the cylindrical storage battery resides in that the block 2 of electrodes is mounted in the body 1 of the cylindrical storage battery, whereupon the lid 3 thereof with the gasket 4 is installed. Then, the edge of the body 1 of the cylindrical storage battery is rolled-in through the gasket 4 to the battery lid 3. Thereafter, the cylindrical storage battery is filled with measured electrolyte via the opening 5 in the battery lid. This, according to the invention, makes it possible to rule out the ingress of electrolyte to the surfaces to be rolled-in thereby enhancing the reliability of sealing the cylindrical storage battery. Besides, the filling-in of electrolyte subsequent to the rolling-in of the edge of the body 1 of the cylindrical storage battery enables one to exclude the spilling of electrolyte and, therefore, accident prevention and improve labour conditions. And, finally, electrical charging and discharging of the cylindrical storage battery are effected consecutively with the valve 6 being installed in the lid 3 of the storage battery.

The present invention makes it possible to reduce the losses of electrolyte.

We claim:

1. A method of assembling a cylindrical storage battery, comprising the following sequence of operations:
    installing a block of electrodes in a body of a cylindrical storage battery, which body has an edge;
    mounting a lid of said cylindrical storage battery on the body of said storage battery which lid has an opening;
    accomodating a gasket between said edge of said body and said lid;
    rolling-in said edge of said body via said gasket to said lid;
    filling said body with a measured quantity of electrolyte through said opening in said lid;
    electrically charging and discharging said cylindrical storage battery; and
    mounting a valve above said opening in said lid.

* * * * *